Jan. 30, 1934. A. ZANZI 1,945,302
PROCESS FOR MANUFACTURING MACHINE PARTS
Filed May 19, 1930
Fig. 1
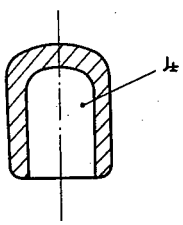
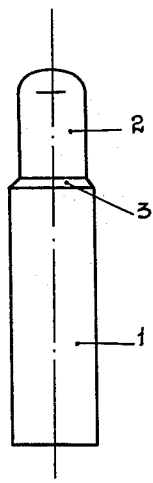
Fig. 2
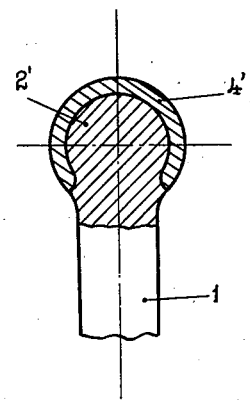
Fig. 3
Inventor
Albino Zanzi,
By
atty Patented Jan. 30, 1934

1,945,302

UNITED STATES PATENT OFFICE 1,945,302

PROCESS FOR MANUFACTURING MACHINE PARTS

Albino Zanzi, Ivrea, Italy

Application May 19, 1930, Serial No. 453,708, and in Italy May 22, 1929

2 Claims. (Cl. 29—148)

In machines generally, and more particularly in motor vehicles, parts of elongated shape are often employed, in which one only or both ends are subjected to a considerable work by friction or other special stress, so that different features are required at these ends with respect to the other portions of the machine part.

The body of the machine part should be of mild iron or steel in order to avoid the risk of breakage under the action of rough shocks, while one or both its ends, which are submitted e. g. to the contact with other members under considerable pressures, should be very hard in order to resist wear and tear.

The thermic treatments used for improving the resistance to wear and tear are always very delicate and while they are useful for manufacturing a small number of parts, they are rather costly and difficult to carry out in a commercial manufacture and do not give further a hard layer of sufficient thickness for ensuring a long life of the machine part.

Applicant has proposed in joint application Ser. No. 343,929 filed March 2, 1929, now Patent No. 1,904,430, dated April 18, 1933 a process for manufacturing valves for combustion engines based on the connection of two metals of different grades by hot pressing.

This invention now extends the process described in the earlier application to the manufacture of machine parts adapted to work in the above mentioned manner.

For manufacturing a machine part comprising a spindle portion and a head portion of any form, I employ for these two parts two different metals, each of which is best suited to the work to which it has to be subjected.

The junction between the two portions is obtained by first cutting the bar adapted to form the spindle portion with a reduced end and then fitting thereon a cap corresponding in size to the said reduced end and made of high grade metal. The end of the bar with the cap mounted thereon is next heated until a good forging temperature is attained, and the parts thus assembled and heated are brought under a forging press by means of which the head of the desired ultimate form is obtained in one operation.

The machine parts manufactured by the above process have the further advantage that they can be easily and cheaply manufactured on a commercial scale.

I will now describe by way of example the process for manufacturing a ball headed bolt for the joints of the steering gear of motor vehicles, according to my invention.

On the accompanying drawing, Figure 1 is a sectional view showing the cap adapted to form the head portion.

Figure 2 shows the piece from which the spindle portion is obtained.

Figure 3 shows, partly in section, the ball headed bolt after the pressing operation.

The spindle 1 is provided above with a reduced portion 2 connected at 3 with the spindle body and suitably rounded above.

I fit on the reduced portion 2 a cap 4 having an inner bore corresponding to the outer shape of the reduced portion 2 and with suitably bevelled outer edges.

The two parts assembled together are heated and then brought in a press where the piece shown in Figure 3 is obtained. After the pressing operation the cap 4 is of nearly uniform thickness and surrounds the part 2' which has been correspondingly upset.

The junction between the two materials is so perfect that it is impossible to detach the elements from each other and this connection can be improved by suitably choosing the materials employed.

I can employ for the spindle portion e. g. a cheaper steel while for the head portion 4' I choose a high grade steel. It is useful to employ for the spindle a material having a coefficient of expansion ot less than that of the material utilized for the head. By varying the size of the cap with respect to the bore therein and that of the spindle with respect to the cap, I can obtain different junctions according to the use and to the work to which the machine part shall be submitted.

This invention can be employed in connection with any machine part having the above mentioned features.

What I claim is:

1. A process for manufacturing an elongated metallic element having an enlarged head with a covering of a different metal which comprises, reducing the diameter at one end of a stem an amount substantially equal to the thickness of said covering, rounding the end surface of said reduced portion, placing a thimble of a thickness somewhat greater than the thickness of the desired covering on said reduced portion of the stem, heating and upsetting said reduced portion and thimble simultaneously, so that said reduced end forms a spherical head and said thimble forms a relatively thin covering for said head.

2. A process for manufacturing an elongated metallic element having an enlarged head with a covering of a metal different than the main body of the said element which comprises, reducing the diameter at one end of a stem an amount substantially equal to the thickness of said covering, placing a thimble composed of the covering metal on said reduced portion, and upsetting said reduced portion and thimble simultaneously to assume an enlarged head of the desired shape.

ALBINO ZANZI.